No. 885,447. PATENTED APR. 21, 1908.
J. W. CROSS.
BRAKE.
APPLICATION FILED SEPT. 13, 1907.
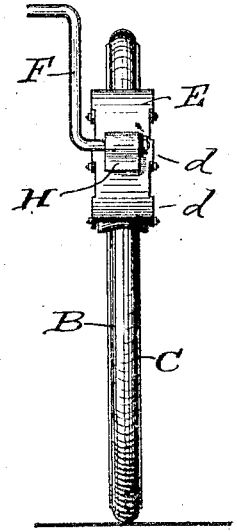
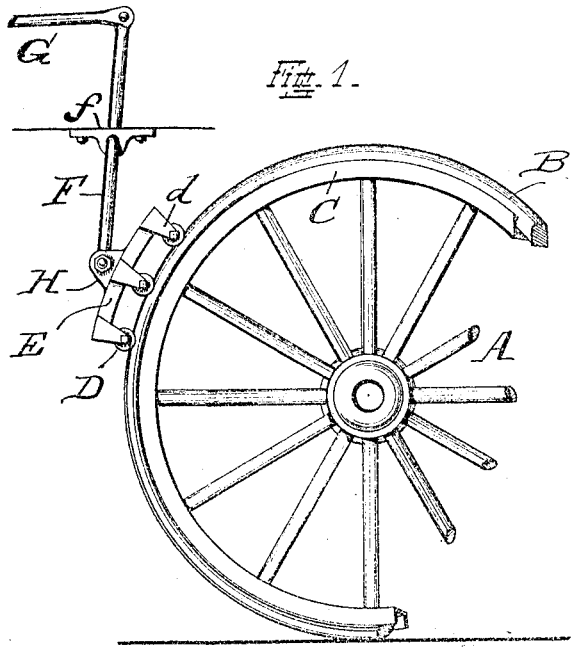
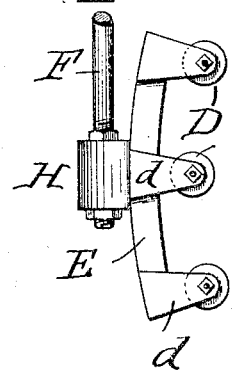
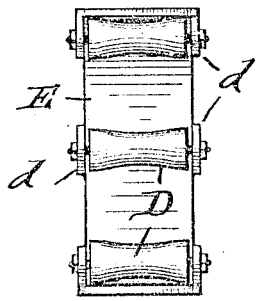
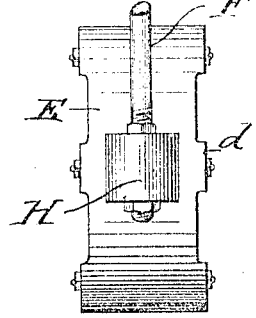
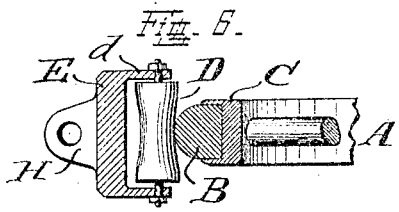
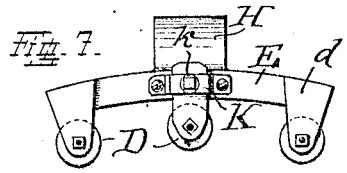
Witnesses.
T. Le Beau
James T. Kink
Inventor.
James W. Cross
by C. Spengel atty

UNITED STATES PATENT OFFICE.

JAMES WAITE CROSS, OF WALTON, KENTUCKY, ASSIGNOR OF ONE-HALF TO BENJAMIN B. ALLPHIN, OF WALTON, KENTUCKY.

BRAKE.

No. 885,447.    Specification of Letters Patent.    Patented April 21, 1908.

Application filed September 13, 1907. Serial No. 392,623.

*To all whom it may concern:*

Be it known that I, JAMES W. CROSS, a citizen of the United States, and residing at Walton, Boone county, State of Kentucky, have invented certain new and useful Improvements in Brakes for Cushion-Tires; and I do declare the following to be a clear, full, and exact description of the invention, attention being called to the accompanying drawing, with the reference characters marked thereon, which form also a part of this specification.

This invention relates to improvements in brakes to be used in connection with vehicle-tires which are made of soft or yielding material like cushion-tires for instance and where the usual brake by its contact would prove injurious and wear or destroy the tire.

The invention consists of the construction as hereinafter described and pointed out in the claim and as illustrated in the accompanying drawing, in which:—

Figure 1, shows in side-elevation a portion of a vehicle-wheel having a cushion-tire, my new brake being shown as applied against the tire on the face of the rim to check the wheel. Fig. 2, is an edge-view of the wheel as shown in Fig. 1, and with the brake applied. Figs. 3, 4, and 5, are respectively side, front and rear-views of my brake-shoe slightly modified and shown at enlarged scale. Fig. 6, is a horizontal section through this brake-shoe between its ends, showing it applied as it appears in Fig. 1, the rim of the wheel being also shown in cross-section. Fig. 7, is a side-elevation of the brake-shoe illustrating adjusting means whereby the same may be fitted against the periphery of a particular wheel.

A, indicates a suitable vehicle-wheel which is provided with a customary cushion-tire B, around its rim C. These tires are generally of rubber and if the usual brake-shoe is applied against them, the unyielding contact of the rigid material of the same with the yielding rubber destroys this latter after very few applications, loosening also the tire in its seat, as well as tearing the surface of the same. To avoid this I provide for contact with the rubber-surface of the tire a number of rollers D, preferably three, which are mounted in bearings d, on opposite sides of the brake-shoe E. This latter as well as bearings d, are preferably made of a suitable cast-metal and the whole structure may be one integral casting. Rollers D, may also be metal, or hard wood, or a suitable composition may be used. They are preferably concaved between their ends.

When this brake is applied the rollers at the first contact roll with the tire, so that no rigid surface bears against the rubber until the speed of the wheel is checked and whereby all injurious effects upon the tire are avoided.

This brake-shoe may be attached in the customary way, to a brake-arm F, supported in a bearing f, and operated by means of a brake-rod G, in the usual manner. A lug H, is provided for its connection to the end of arm F, two forms of connection being shown, the one in Figs. 1, and 2, differing from the one shown in the rest of the figures. The details of this connection have no particular bearing on my invention and may be readily understood from inspection of the drawing.

This brake is quite useful in connection with heavier vehicles as for instance with hearses for which it is particularly intended.

It is obvious that the projection of bearings d, must be such that the surfaces of all the rollers fit against the tire so that all come in equal contact with the same. This requires a special shoe for each size diameter of wheel and in which the rollers are set to the particular peripheral line of the tire of such wheel.

To avoid the requirement of manufacturing too many shapes I provide for adjustment of the roller-bearings on the shoe and more particularly and preferably of the one for the center-roller as best shown in Fig. 7. The mechanical details of this arrangement may be variously arranged, a preferable construction being the use of a socket K, into which the bearings are fitted.

To fit a particular wheel, the brake-shoe is set against the tire of the same with the end-rollers in contact, after which the middle-roller is moved in or out as the particular case may require and until it is also properly seated against the tire, after which the adjustment is secured by set-screws k.

Having described my invention, I claim as new:

A brake-shoe consisting of a general supporting-member, three rollers provided thereon, one at each end and one between them, bearings for each roller, those at the ends being rigidly secured, while the others between them are adjustably mounted, and means for supporting the entire device in position opposite the periphery of a wheel.

In testimony whereof I hereunto affix my signature in the presence of two witnesses.

JAMES WAITE CROSS.

Witnesses:
C. SPENGEL,
T. LE BEAN.